United States Patent Office.

EVANDER W. RANNEY, OF NEW YORK, N. Y.

Letters Patent No. 95,378, dated September 28, 1869.

IMPROVED COMPOSITION FOR ROOFING, PAVEMENTS, &c.

The Schedule referred to in these Letters Patent and making part of the same.

*To all whom it may concern:*

Be it known that I, EVANDER W. RANNEY, of the city of New York, county and State of New York, have invented a new and useful Improvement in Pavements for Streets, Sidewalks, &c.; and I do hereby declare that the following is a full, clear, and exact description of the same.

This invention consists in a combination of gravel, broken stone, sand, cinders, or other hard and durable substance, mixed with tar, prepared linseed-oil, pitch, rosin, carbojapanis, asphaltum, petroleum, or some similar bituminous substance, and sometimes a quantity of the offal of printing-rollers, in such proportions as will make a firm, hard, water-tight, elastic substance for street-pavements, roads, walks, floors, roofing, &c.

To make this composition, I take clean, pure gravel, broken stone, cinders, or some hard, durable substance, of such size as may be suitable for the kind of work to be done, and when dry or warm, I mix it with hot tar, (the ordinary pine-tar I think preferable,) petroleum or prepared linseed-oil, to which has been added some bituminous substance, as rosin, carbojapanis, pitch, asphaltum, or the offal of printing-rollers, (previously melted,) and in such proportions as the season, climate, and other circumstances seem to demand.

When the materials have been thoroughly and uniformly mixed, so that each and every particle of the solid matter is thinly coated or saturated with the hot liquid, it is ready for use. It is then spread evenly upon the foundation, and rolled smooth and level with heavy rollers. The foundation may be the natural soil, concrete, brick, stone, wood, or any other firm substance.

The coarser parts of the mixture should be laid at the bottom, and the top layer should be made of fine gravel or sand.

When thoroughly rolled, the surface may be covered with a thin coat of sand or fine gravel, and when the composition is laid, not to exceed two inches in thickness, it may be used in a few hours; but if the concrete exceed two inches, it will require from one to three weeks to become hard enough for use.

What I claim as my invention and improvement, is—

The combination of these materials, and their use, for the purposes and in the manner substantially as set forth.

EVANDER W. RANNEY.

Witnesses:
J. K. HERBERT,
A. R. CUSHMAN.